2,867,119

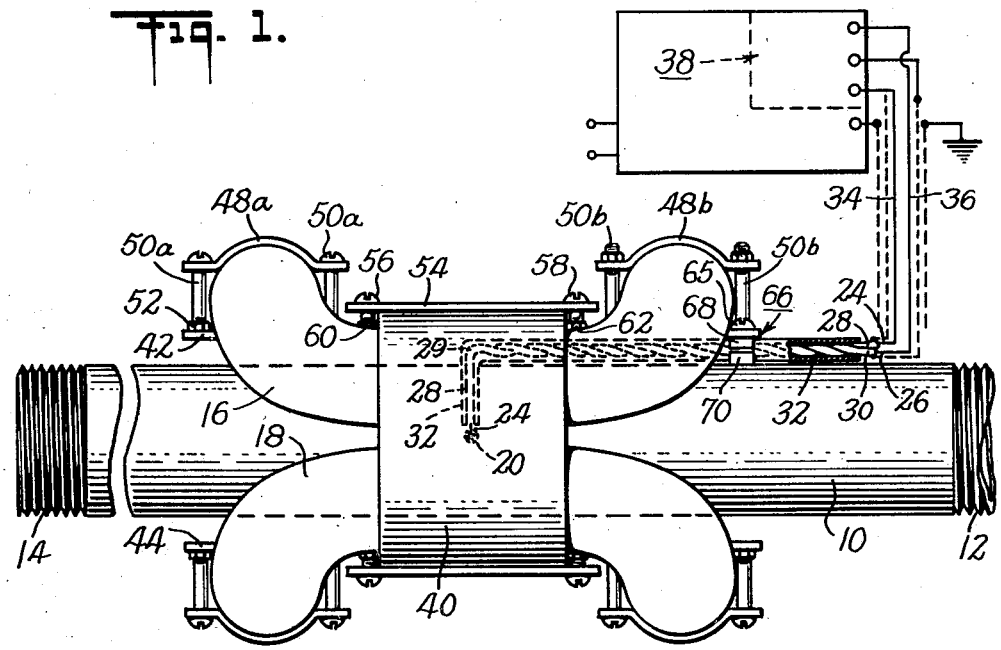
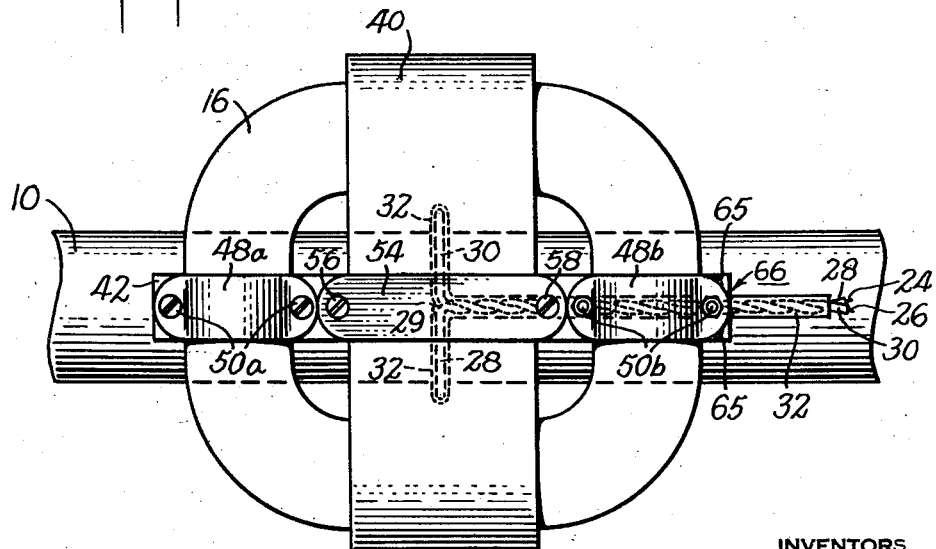
INVENTORS
Stocker S. Sturgeon
Neil E. Handel
BY
Curtis, Morris+Safford
ATTORNEYS

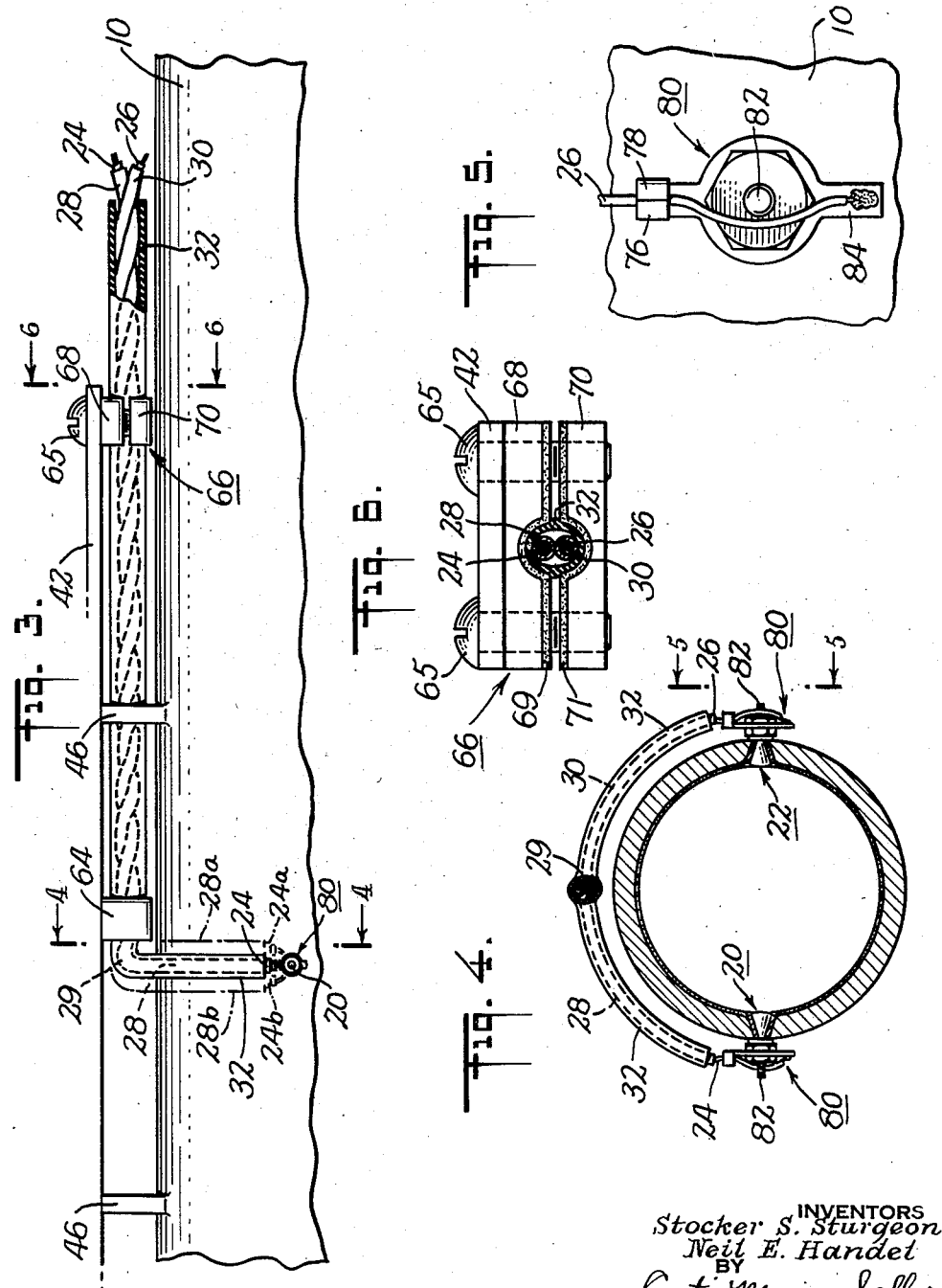

ELECTROMAGNETIC FLOWMETER

Stocker S. Sturgeon, Foxboro, and Neil E. Handel, Wrentham, Mass., assignors to The Foxboro Company, Foxboro, Mass., a corporation of Massachusetts Application September 14, 1954, Serial No. 455,923

6 Claims. (Cl. 73—194)

This invention relates to electromagnetic flowmeters. In particular, this invention relates to improved means for making electrical connection to the fluid-contacting electrodes of such a device.

A typical electromagnetic flowmeter includes a pipe section through which passes the fluid whose flow rate is to be measured, means for producing a magnetic field transversely of the direction of fluid flow through the pipe, and a pair of electrodes in contact with the fluid and positioned in the interior of the pipe on a line transverse to both the direction of magnetic flux and the direction of fluid flow. In accordance with known electromagnetic principles, the movement of the fluid in the pipe generates between the electrodes a voltage the magnitude of which is a function of the rate of flow. The voltage so generated may be amplified to a suitable power level and used, for example, to operate one or more of a variety of recording or flow controlling devices.

One of the problems with such flowmeters has been the difficulty of providing practical means for coupling the generated electromotive force out from the interior of the pipe section. For example, any output lead wires connected to the contact electrodes tend to form a loop that may be inductively coupled to the magnetic coils, thereby producing in the output lead wires a pick-up signal which impairs the operability of the flowmeter. This induction signal tends to overload the amplifier connected to the output lead wires, and thereby limit its usable gain.

The problem is heightened by the great intensity of the magnetic fields commonly employed in induction flowmeters, since even a small degree of coupling between the coils and the lead wires can produce a substantial pick-up signal considerably larger than the intelligence signal. In addition, flowmeters are often installed in locations where they are subject to severe environmental conditions, such as shock, vibration, etc., that tend to jar the electrode leads and cause variations in the amount of coupling between the leads and the coils.

Accordingly, it is an object of this invention to provide a connecting lead arrangement which is superior to those used heretofore. It is a further object of this invention to provide a connecting lead arrangement wherein the leads are readily adjustable to a position of minimum mutual inductance with respect to the flowmeter coils, and which when locked in place hold their position firmly under adverse conditions of shock and vibration.

In an embodiment of the invention described in more detail hereinbelow, the electrodes are connected to individual insulated lead wires in a manner permitting some flexibility at the point of connection. These wires are encased in rigid copper shield tubes, which extend circumferentially upwards, in the form of a "saddle," around the sides of the pipe approximately 90 degrees to a point of joinder adjacent the top of the pipe. From this point of joinder, the tubes are twisted together and extend longitudinally along the top of the pipe, passing through a support framework and a lead clamping device. To adjust the lead structure to a position of minimum inductive pick-up, the lead clamping device is released and the rigid shield tubes including the saddle portion are moved as a unit longitudinally along the pipe wall until the flowmeter output voltage (measured with no fluid movement in the pipe) is at its lowest value. The shield tubes are then locked firmly in that position by tightening up the lead clamping device.

Other objects, aspects and advantages of the present invention will be apparent from, or pointed out in, the following description considered together with the accompanying drawings, in which:

Figure 1 is a side elevation view of an induction flowmeter including an electrode lead arrangement in accordance with the present invention;

Figure 2 is a plan view of the flowmeter of Figure 1;

Figure 3 is a fragmentary vertical section of the flowmeter of Figure 1, particularly showing the lead clamping arrangement;

Figure 4 is a cross section taken along lines 4—4 of Figure 3; and

Figure 5 is a detailed view taken along lines 5—5 of Figure 4, particularly showing the manner in which the lead wire is connected to the electrode.

Referring now to Figure 1, the fluid whose flow rate it is desired to measure passes through a section of stainless steel pipe 10, the opposite ends 12 and 14 of which are threaded so that the pipe may readily be coupled into an operating flow system (not shown). In the embodiment described herein, the pipe 10 has an inside diameter of approximately two inches and a wall thickness of approximately three-sixteenths of an inch. Other pipe sizes may, of course, be employed, with suitable changes in the dimensions of the associated flowmeter elements as described herein. The interior wall of the pipe is normally provided with an insulating liner, advantageously formed by baking a vitreous enamel direction on the pipe inner wall, or by coating the interior with a thin layer of chemical and heat resistant plastic.

Positioned around the pipe 10, and approximately centrally disposed between the two ends thereof, is a magnetic flux producing structure consisting of an upper coil 16 and a lower coil 18. These two coils are identical as to shape, number of turns, size of wire, etc., and are energized by a source of alternating current (not shown), for example the usual line source of 110 volts and having a frequency of 60 cycles per second. The coils are positioned symmetrically with respect to the pipe axis, i. e. "back-to-back," and their respective lead-in wires (not shown), are connected in parallel with the source of alternating current. The coil energizing connections, furthermore, are made in such a manner that the magnetic fields produced by the coils are additive, i. e. the coils are energized in phase with each other, so that when the flux produced by one coil in the center thereof is directed upwardly, the flux produced by the other coil in the center thereof is also directed upwardly, and vice versa.

Surrounding the two coils 16 and 18 is a continuous laminated core 40, formed of any transformer iron but preferably of silicon steel, and serving as a split return path of low reluctance for the flux passing through the pipe 10. That is, flux passing downwardly through the pipe divides into two components when it reaches the lower horizontal portion of the core 40, the two components traveling horizontally outwards away from the center of the pipe, up the vertical sides of the core, and inwardly along the upper horizontal core portion in the center of which they combine again and turn downwardly through the pipe to complete the path. The laminations tend to reduce eddy current losses in the usual manner, and the core advantageously is potted with a suitable compound to minimize hum effects.

The coils 16 and 18 and the core 40 are supported by parallel bridge members 42 and 44 extending longitudinally of the pipe 10 on opposite sides thereof. These bridges are identical, and are secured to the pipe by arch members 46 (see Figure 3), which may, for example, be welded to both the pipe and the corresponding bridge. Since the upper and lower coil and core support structures are similar, the details of the upper support only will be described.

In the two places where the coil 16 passes transversely over the top of the pipe 10, it is fastened in position by curved clamps 48a and 48b which are shaped to fit snugly over the outer surfaces of the coil. Each of these clamps is secured to the bridge 42 by bolts 50a and 50b threadedly engaged with corresponding holes extending through the bridge, the bolts being locked into position by nuts 52. Similarly, the core 40 is held in position, where it passes over the top of the pipe 10, by a flat plate 54 which is fastened to the bridge 42 by two bolts 56 and 58 threaded into holes in the bridge and locked in place by nuts 60 and 62.

The details of such a coil and core arrangement are disclosed more fully in U. S. patent application Serial No. 455,922, filed by Neil E. Handel et al. on September 14, 1954. It may be noted, however, that the magnetic field produced by the combination of two such coils is substantially uniform throughout the important sectional region within the pipe where the flow-responsive electromotive force is to be generated; and that the field intensity is essentially independent of the magnetic properties of the core.

As shown most clearly in Figures 3 and 4, the flowmeter includes a pair of cone-shaped electrodes 20 and 22 positioned 180 degrees apart in the wall of the pipe 10. These electrodes extend through corresponding holes in the pipe wall, from which they are insulated by appropriate means (for example, as disclosed more fully in U. S. patent application Serial No. 455,949, filed by S. S. Sturgeon on September 14, 1954, now Patent No. 2,800,016), and make electrical contact with the fluid flowing through the pipe. The external tips of the electrodes 20 and 22 are connected respectively to output lead wires 24 and 26, which preferably are insulated with a heat-resistant plastic coat such as Teflon. Those leads extend upwards through copper shield tubes 28 and 30 which are joined together at 29, for example by soldering, at the center top of the pipe to form a "saddle" around the pipe 10 in a plane generally perpendicular to the pipe axis.

From their juncture, the shield tubes extend to the right along the top, and parallel to the axis, of the pipe 10, and are twisted together to increase their structural rigidity as well as to reduce inductive pick-up from the flowmeter coils and from neighboring electrical equipment. The shield tubes also advantageously are encased in an insulating sheath 32 which may be formed of a fiberglass-silicone composition, and which preferably completely covers the copper tubes down to a point adjacent the electrodes.

With such a construction, there will be no substantial inductive coupling between the magnetic coils and the electrode leads, not only because the leads are shielded throughout very nearly their entire length, but also because the shield tubes and the leads therein are twisted where they extend longitudinally along the pipe and, in the saddle portion, are arranged to lie in a plane essentially parallel to the magnetic lines of force. However, due to normal manufacturing tolerances, the desired geometrical configuration cannot ordinarily be obtained precisely, and hence, especially because of the very large flux intensities required for flowmeter operation (e. g. 500 gauss or so), there will often be initially an unacceptably large signal coupled to the electrode leads from the magnetic coils.

It has been found that this problem may be solved by the novel structure disclosed herein, wherein the leads are connected to the electrodes in a quasi-flexible manner, and wherein the rigid shield including the saddle portion is movable as an integral unit longitudinally of the pipe.

Referring now particularly to Figure 3, the twisted shield tubes 28 and 30 adjacent the saddle portion pass through a centrally located hole in a support block 64. This block may be formed of brass, and is bolted to the underside of the bridge member 42 which serves also as a support for the coil and core structure as described hereinabove. To the right of the support block, the tubes extend through the passageway formed by the upstanding legs of the right hand arch member 46.

Also bolted to the underside of the bridge 42, at the far right hand end thereof, is a lead clamp device generally indicated at 66, which includes a base 68 and a pressure plate 70, and which may be formed of brass. The adjacent faces of these two elements 68 and 70 preferably are provided with layers of soft insulating material 69 and 71 which are formed with centrally located opposing recessions through which the shield tubes pass, as shown more clearly in Figure 6. The curved surfaces of these recessions hold the tubes firmly in place when the lead clamp bolts 65 are pulled up tight.

Adjacent the electrodes 20 and 22, the lead wires 24 and 26 protrude slightly beyond the ends of the respective shield tubes 28 and 30. These protruding lead portions are somewhat flexible, and, as shown particularly in Figure 5, each extends down through the barrel formed by the folded and crimped ears 76 and 78 of a corresponding two-ended terminal generally indicated at 80. From the terminal barrel, which grips it tightly, the lead passes around the electrode stem 82 to a lug 84 on the lower arm of the terminal 80 where it is soldered in place.

To achieve minimum coupling to the leads 24 and 26, and referring now to Figures 1 and 3, the right hand ends of the leads are first connected to a sensitive voltage measuring device, for example as indicated diagrammatically at 38, and the bolts 65 of the lead clamp 66 are backed off sufficient to permit movement of the shield tubes 28 and 30 through the clamp. The shield structure, including the saddle portion, is then moved back and forth longitudinally as an integral unit through the support block 64 and the clamp 66, until the measuring device reads minimum voltage. When that condition has been achieved, the lead clamp bolts are pulled up tight, and the lead structure is thus firmly held in the desired position. It has been found that by such means the false pick-up signal can readily be reduced to below 10 microvolts, which is ample for essentially all induction flowmeter applications, and that, when the shield tubes have been secured in place, the pick-up signal is substantially unaffected by normal environmental conditions such as shock and vibration.

It may be noted that, as the shield tube 28 is moved to other positions (as indicated at 28a and 28b, Figure 3), the protruding portion of the lead 24 is bent into corresponding positions 24a and 24b. This lead 24, in combination with the other lead 26 extending down the far side of the pipe 10 and the conductive path in the fluid between the electrodes 20 and 22, forms a loop (best shown in Figure 4) that lies in a plane nearly parallel to the magnetic flux produced by the coils 16 and 18. Therefore, by bending the protruding ends of the leads as indicated above, the effective plane of the loop may be controlled (i. e. the amount of flux encircled by the loop may be varied), and hence the magnitude of inductive pick-up can be set precisely so as to give a minimum signal on the leads 24 and 26.

When the lead ends are soldered to the electrodes, there is a tendency for the hot solder to run back up the protruding portions a short distance and to harden as an integral part of the lead wires. Thus, as the lead structure is moved back and forth, the bending stresses in the solder-hardened portions of the wire may frequently cause the wire to crack or break and thereby disable the flowmeter. However, it has been found that this problem may be solved by the two-ended terminal arrangement previously described. That is, the crimped ears 76 and 78 of this terminal 80 firmly grip the wire above the region into which the solder runs when the wire end is soldered to the lug 84 on the terminal lower arm. Hence, the solder-hardened portion of wire is fixedly held between two points (i. e. between the two projecting arms of the terminal), and the flexible portion of wire above the ears 76 and 78 is free to move and bend as the lead structure is adjusted.

Accordingly, it will be apparent that the structure disclosed herein achieves the several objects set forth above, and particularly provides a practical electrode connecting arrangement that is simple to manufacture and assemble, yet readily adjustable to a position of minimum inductive pick-up. It will further be apparent that the rigid shield structure is well adapted and is supported in such a way as to resist deformation and to maintain the desired minimum coupling over long periods of time.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as to meet the requirements of particular applications, it being understood that various modifications may be made without departing from the scope of the invention as limited by the prior art.

We claim:

1. In an induction flowmeter of the type wherein the fluid whose flow is to be measured travels transversely across the lines of force of a magnetic field, and wherein two electrodes are at least partially immersed in the fluid at points on a line generally transverse of the direction of fluid flow and also generally transverse of the magnetic lines of force, such that movement of the fluid causes a cutting of the magnetic lines of force and thereby generates a voltage between the electrodes proportional to the rate of fluid flow, the combination which comprises: a section of metallic pipe through which fluid may be caused to flow, a layer of electrical insulating material positioned adjacent the inner wall of said pipe to prevent short-circuiting of electromotive forces generated within said fluid, coil means disposed external to said pipe and connected to a source of alternating-current energizing potentials, said coil means being arranged to produce magnetic flux in the interior of said pipe, a pair of conductive electrodes extending through the wall of said pipe in regions generally on opposite sides thereof and arranged to make electrical contact with said fluid, means for insulating said electrodes from said pipe, a pair of rigid hollow shield tubes positioned outside said pipe, a portion of said shield tubes being twisted together and extending longitudinally along said pipe wall at an approximately uniform distance therefrom, said rigid hollow shield tubes having an approximately right angle bend at one end of said twisted portion with each tube extending from said one end in opposite directions, circumferentially around said pipe wall to a point adjacent but slightly away from said electrode so as to form a rigid saddle portion positioned in a plane generally perpendicular to the pipe axis, a pair of insulated lead wires each connected to a respective one of said electrodes and each extending through a respective one of said rigid hollow shield tubes for connection to electrical amplifier means, a clamping device fixedly positioned with respect to said pipe section and arranged to hold said shield tube twisted portion in a firm pressure grip so as to prevent longitudinal or lateral movement thereof, said clamping device being readily releasable so as to permit said rigid shield tube structure including said saddle portion to be moved as an integral member longitudinally of said pipe whereby the flexible portions of said lead wires between said electrodes and said shield tubes may be deformed slightly into a position providing minimum inductive coupling between said coil means and said lead wires, and means for supporting said coil means and said clamping device on said pipe section.

2. In an induction flowmeter wherein a magnetic field is caused to pass through the fluid whose flow rate is to be measured, the lines of force of said field being generally transverse of the direction of fluid flow, and wherein two metallic electrodes are arranged to contact the fluid at points on a line generally transverse of the direction of fluid flow and also generally transverse of the magnetic field direction such that movement of the fluid causes a cutting of the magnetic lines of force and thereby generates a voltage between the contact electrodes proportional to the rate of fluid flow, the combination of: a section of pipe through which the fluid flows, the interior surface of said pipe section comprising a layer of electrically non-conductive material, magnetic flux producing means disposed external to said pipe adjacent opposing sides thereof and adapted to produce a magnetic field through said pipe, said flux producing means being connected to a source of alternating-current energizing potentials, a pair of conductive electrodes extending through said pipe wall and arranged to contact said fluid in regions generally adjacent opposing interior sides of said pipe, two output lead wires each connected to a respective one of said electrodes, a first portion of said wires extending around said pipe in a plane generally parallel to the magnetic lines of force produced in said pipe by said magnetic flux producing means to a region located circumferentially between said electrodes, a second portion of said wires extending from said region longitudinally along said pipe for connection to electrical amplifier means, rigid shield means positioned about and supporting said wires at least in the second portion thereof, releasable clamping means for gripping and holding said shield means in a fixed position, said clamping means being adapted when released to permit easy longitudinal movement of said rigid shield means as an integral unit whereby said lead wires may readily be adjusted to a position of minimum inductive pick-up with respect to said magnetic flux producing means, and means supporting said magnetic flux producing means and said clamping means firmly in position with respect to said pipe section.

3. In an induction flowmeter of the type wherein the fluid whose flow is to be measured travels transversely across the lines of force of a magnetic field, and wherein two electrodes are at least partially immersed in the fluid at points on a line generally transverse of the direction of fluid flow and also generally transverse of the magnetic lines of force, such that movement of the fluid causes a cutting of the magnetic lines of force and thereby generates a voltage between the electrodes proportional to the rate of fluid flow, the combination which comprises: a section of metallic pipe through which fluid may be caused to flow, a layer of electrical insulating material positioned adjacent the inner wall of said pipe to prevent short-circuiting of electromotive forces generated within said fluid, magnetic flux producing means disposed external to said pipe on opposite sides thereof and connected to a source of alternating-current energizing potentials, a pair of conductive electrodes extending through the wall of said pipe in regions generally on opposite sides thereof and arranged to make electrical contact with said fluid, means for insulating said electrodes from said pipe, a pair of rigid hollow shield tubes positioned outside said pipe, a first portion of said shield tubes being twisted together and extending longitudinally along said pipe wall and at an approximately uniform distance therefrom, said rigid hollow shield tubes having an approximately right angle bend at one end of said twisted portion with a second portion of each tube extending from said one end in opposite directions circumferentially around said pipe wall to a point adjacent but slightly away from said electrode so as to form a rigid saddle-like structure lying in a plane generally perpendicular to the pipe axis, a pair of insulated lead wires each connected to a respective one of said electrodes in a quasi-flexible manner and each extending through a respective one of said rigid hollow shield tubes for connection to electrical amplifier means, a clamping device fixedly positioned with respect to said pipe section and arranged to hold said shield tube twisted portion in a firm pressure grip so as to prevent longitudinal or lateral movement thereof, said clamping device including a base member and a pressure plate each positioned on opposite sides of said twisted tube portion, compressive means for urging said base member and said pressure plate towards each other, said compressive means being readily releasable so as to permit said rigid shield tube structure including said saddle portion to be moved as an integral member longitudinally of said pipe whereby the flexible portions of said lead wires between said electrodes and said shield tubes may be deformed slightly into a position providing minimum inductive coupling between said magnetic flux producing means and said lead wires, and means for supporting said magnetic flux producing means and said clamping device on said pipe section.

4. In an induction flowmeter, the combination which comprises: a section of pipe adapted for the passage of fluid therethrough, at least one coil disposed external to said pipe and adapted for connection to a source of alternating-current energizing potential to produce magnetic flux through said pipe, a pair of conductive electrodes extending through the wall of said pipe and arranged to contact said fluid in regions generally adjacent opposing interior sides of said pipe, a pair of terminals exterior of said pipe and each secured to a respective one of said electrodes, said terminals including a connection lug and a wire-supporting barrel, two output lead wires each including a first and second portion, said first portions being connected to a respective one of said connection lugs and extending from the connection lug through the coresponding wire-supporting barrel circumferentially around the exterior of said pipe to a region approximately 90 degrees displaced from said electrodes, said wire-supporting barrels being crimped onto said first portions to hold the ends of said lead wires firmly in position, said second lead wire portions extending away from said region for connection to electrical amplifier means, rigid tube means positioned about and encasing said first portions of said lead wires to form a saddle structure about said pipe lying in a plane generally perpendicular to the pipe axis, said tube means being spaced away from the outer surface of said pipe to permit relative movement therebetween, supporting structure for holding said tube means and adapted to permit longitudinal movement thereof relative to said pipe, the saddle structure always lying in a plane parallel to a predetermined plane which is generally perpendicular to the pipe axis throughout the full range of said longitudinal movement, said tube means encasing the first portions of said lead wires to within a short distance from said electrode stems to permit flexing of the remaining exposed parts of said wires when said tube means is moved longitudinally with respect to said pipe, clamping means fixedly positioned with respect to said pipe section for firmly gripping and holding said tube means against lateral or longitudinal movement, said clamping means being readily releasable to permit easy longitudinal adjustment of said tube means throughout a relatively small range to flex said exposed portions of lead wire while holding the lead wire portions in said saddle structure at a fixed angle with respect to said pipe axis, whereby said exposed portions may be adjusted to a selected position giving minimum inductive pick-up from the magnetic field produced by said coil and whereby said lead wires may be clamped securely in the selected position, and support means for holding said coil and said tube clamping means in position adjacent said pipe section.

5. In an induction flowmeter, the combination which comprises: a section of pipe adapted for the passage of fluid therethrough, coil means disposed externally of said pipe and adapted for connection to a source of alternating-current to produce essentially parallel magnetic lines of force through said pipe, a pair of conductive electrodes extending through the wall of said pipe and arranged to contact said fluid in regions generally adjacent opposing sides of said pipe, tube means in the form of a generally semi-circular saddle structure having a pair of tubular arms extending circumferentially around the exterior of said pipe and lying in a plane essentially parallel to said magnetic lines of force, the end tips of said saddle arms being spaced away from said electrodes a distance that is short relative to the length of said saddle arms, two output lead wires each connected respectively to one of said electrodes and each including first and second serially-connected portions, said lead wire first portions being flexible relative to said saddle tube means and extending from the respective electrodes to within the end tip of the corresponding saddle arm, said lead wire second portions being positioned within the respective saddle arms and extending around said pipe to a region approximately 90 degrees displaced from said electrodes, said saddle tube means including material tightly fitted about said lead wire second portions so as to maintain said second portions essentially in fixed positions with respect to said saddle arms, and support means for holding said saddle tube means firmly in position about said pipe and spaced a sufficient distance away therefrom to accommodate relative movement therebetween, said support means being constructed and arranged to permit the end tips of said saddle arms to be manually shifted within a small range of positions lengthwise with respect to the pipe axis, the plane of said arms being essentially parallel to said magnetic lines of force within said small range of positions, said support means further being constructed and arranged to secure said tube means firmly with respect to said pipe in any of said positions within said small range of positions, so as to assure that said lead wire second portions are fixedly held in any selected position relative to said magnetic lines of force, the shifting movement of said saddle arms serving to flex said lead wire first portions about the respective electrodes to vary the effective angular positioning of said first portions relative to said lead wire second portions, whereby said lead wire first portions may be adjusted to a position giving minimum magnetic pick-up from the magnetic field through said pipe.

6. In an induction flowmeter, the combination which comprises: a section of pipe adapted for the passage of fluid therethrough, coil means disposed externally of said pipe and adapted for connection to a source of alternating-current to produce essentially parallel magnetic lines of force through said pipe and perpendicular to the longitudinal axis thereof, a pair of conductive electrodes extending through the wall of said pipe and arranged to contact said fluid in regions generally adjacent opposing sides of said pipe, first shield tube means in the form of a generally semicircular metal saddle structure having a pair of tubular arms extending circumferentially around the exterior of said pipe and lying in a plane essentially parallel to said magnetic lines of force, the end tips of said saddle arms being spaced a short distance away from said electrodes, two output lead wires each connected respectively to one of said electrodes and each including first, second and third serially-connected portions, said first lead wire portions being flexible relative to said first shield tube means and extending from the respective electrodes to with n the end tip of the corresponding saddle arm, said second lead wire portions being positioned within the respective saddle arms and extending around said pipe to a region of joinder approximately 90 degrees displaced from said electrodes, said third lead wire portions extending from said region of joinder longitudinally along the side of said pipe, material including electrical insulation means tightly fitted about said lead wire second portions and substantially filling the space between said second portions and the surrounding first shield tube means so as to maintain said lead wire second portions in fixed position with respect to said first shield tube means, support means for holding said first shield tube means spaced a sufficient distance away from said pipe to accommodate relative movement therebetween, said support means including second shield tube means integral with said first shield tube means at said region of joinder, said second shield tube means being closely fitted about said third lead wire portions all along a section thereof extending longitudinally a substantial distance down the side of said pipe away from said region of joinder, said support means further including fastening means for securing said second shield tube means to said pipe, said support means being constructed and arranged to permit said first shield tube means to be manually shifted throughout a small range of positions lengthwise with respect to the pipe axis, the plane of said saddle arms being essentially parallel to said magnetic lines of force in any of said positions within said small range of positions, the shifting movement of said saddle arms serving to flex said lead wire first portions about the respective electrodes to vary the effective angular positioning of said first portions relative to said lead wire second portions, whereby said lead wire first portions may be adjusted to a position giving minimum magnetic pick-up from the magnetic field through said pipe.

References Cited in the file of this patent

UNITED STATES PATENTS

| | | |
|---|---|---|
| 2,722,122 | Soffel | Nov. 1, 1955 |
| 2,724,268 | Raynsford | Nov. 22, 1955 |
| 2,734,380 | Mittelmann | Feb. 14, 1956 |
| 2,770,130 | Romanowski et al. | Nov. 13, 1956 |

FOREIGN PATENTS

| | | |
|---|---|---|
| 695,425 | Great Britain | Aug. 12, 1953 |

OTHER REFERENCES

Article: An Induction Flowmeter Design Suitable for Radio Active Liquids, W. G. James, in Review of Scientific Instruments, vol. 22, No. 12, December 1951 (pp. 989–1002).

Article: A method for Adjustment of Zero Setting of an Electromagnetic Flowmeter by A. Kolin in Review of Scientific Instruments, vol. 24, No. 2, February 1953 (pp. 178, 179).